(12) United States Patent
Hori et al.

(10) Patent No.: US 6,516,285 B1
(45) Date of Patent: Feb. 4, 2003

(54) POSITION DETECTING APPARATUS WITH DSRC FEATURE AND ITS CONTROL METHOD

(75) Inventors: Satoshi Hori, Kanagawa (JP); Hideo Miyazawa, Kanagawa (JP); Yasunori Hagiwara, Tokyo (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 42 days.

(21) Appl. No.: 09/672,590

(22) Filed: Sep. 28, 2000

(30) Foreign Application Priority Data

Sep. 30, 1999 (JP) .......................................... 11-280025

(51) Int. Cl.⁷ .............................................. G01C 17/00
(52) U.S. Cl. ..................... 702/150; 702/152; 342/357.1
(58) Field of Search ................................ 702/150, 152; 342/357.1

(56) References Cited

U.S. PATENT DOCUMENTS 5,512,904 A 4/1996 Bennett
5,568,390 A 10/1996 Hirota et al.
6,252,544 B1 * 6/2001 Hoffberg ................ 342/357.06

FOREIGN PATENT DOCUMENTS

| JP | 07055484 | 3/1995 |
| JP | 2000098017 | 7/2000 |

* cited by examiner

Primary Examiner—John S. Hilten
Assistant Examiner—Stephen J. Cherry
(74) Attorney, Agent, or Firm—Pearne & Gordon LLP

(57) ABSTRACT

The position detecting apparatus of the present invention comprises position detecting means for receiving radio waves for position detection and outputting position information and DSRC means for receiving radio waves for DSRC and processing signals, characterized in that the position detecting means and the DSRC means are controlled via the same CPU and share part or whole of storage means and that the position detecting means is adapted to operate in either the full drive mode or suppress mode.

17 Claims, 14 Drawing Sheets

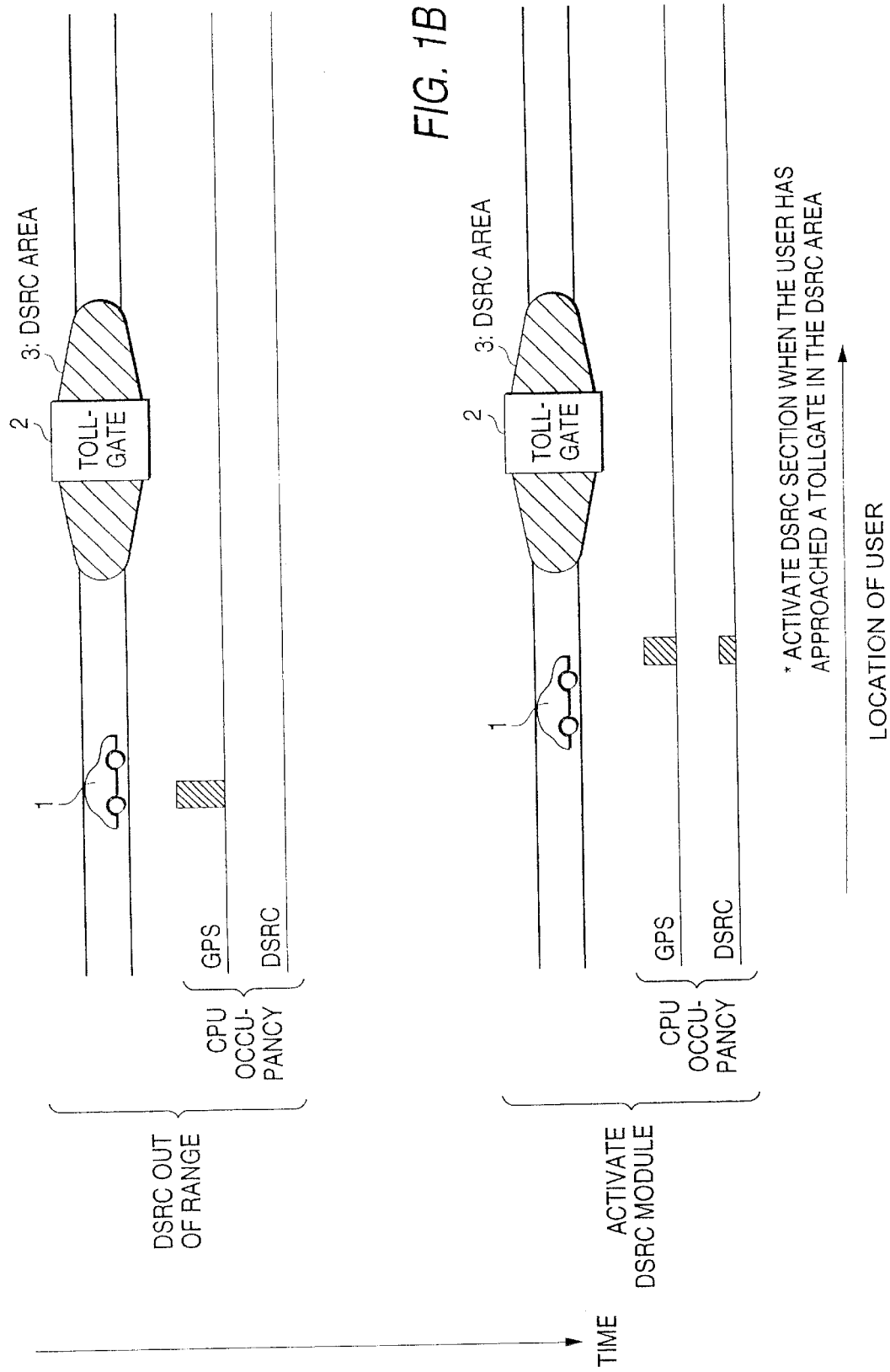

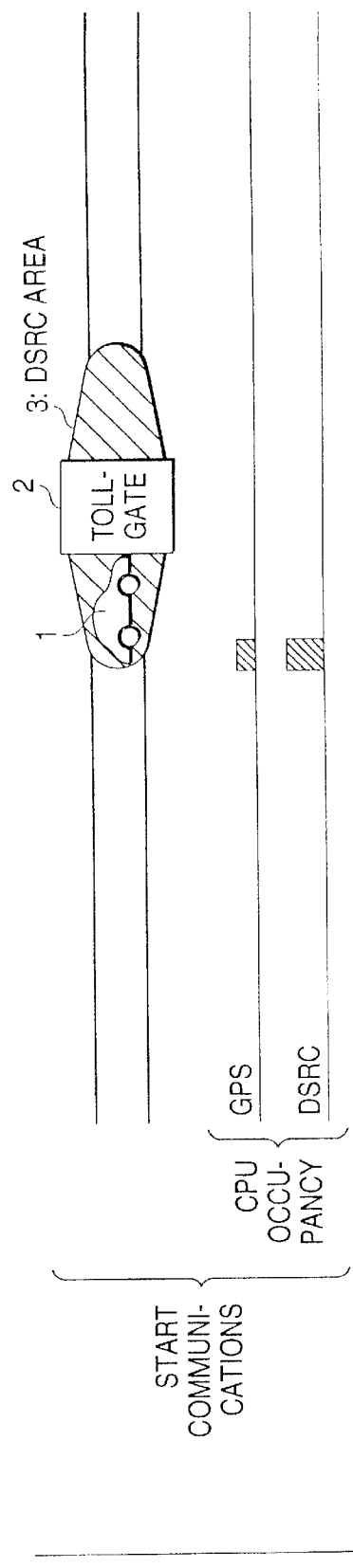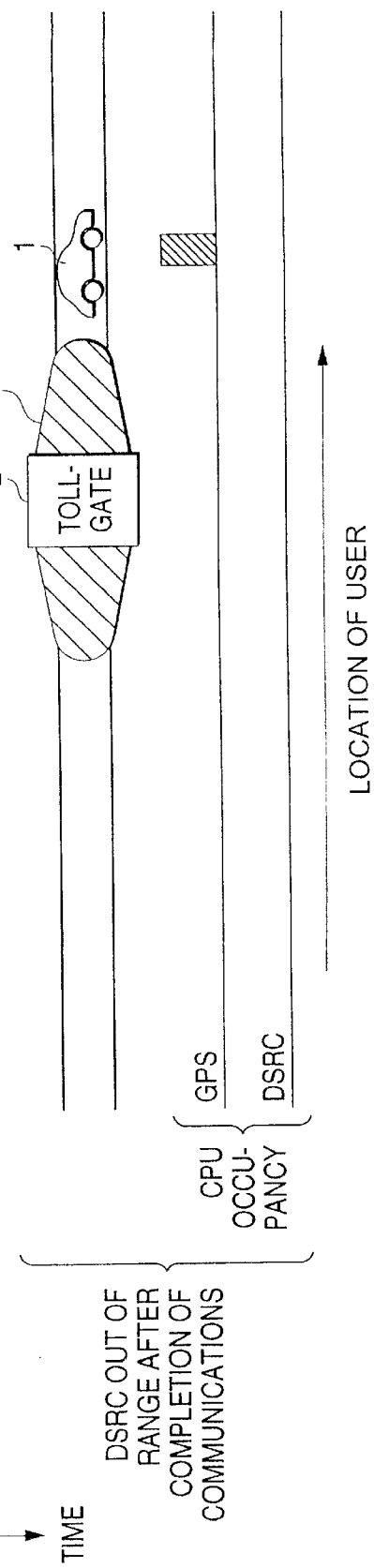

POSITION DETECTING APPARATUS WITH DSRC FEATURE AND ITS CONTROL METHOD

BACKGROUND OF THE INVENTION

1. Field to which the Invention

The present invention relates to position detecting apparatus with DSRC feature and its control method, and in particular to a driving-support system in automobile applications.

2. Description of the Related Art

Conventional position detecting means using radio waves include a position detecting system using satellites and a position detecting system using communication base stations.

The former is a position detecting system using a scheme whereby radio waves are received from a plurality of satellites on a predetermined orbit and the current position of the user is obtained from the difference of the time required for radio waves to reach the Earth. Standalone technologies include the GPS (Global Positioning System) and the GLO-NASS (Global Navigation Satellite System).

The latter is a system whereby the approximate position of the user can be detected at the center of a telecommunications operator by determining which base station area the user is located through the use of densely installed communications base stations. The PHS (Personal Handyphone System) is one of such technologies currently in use.

In addition to the position detecting systems that use satellites, the DSRC (Dedicated Short Range Communication) technology is drawing people's attention and used for communication means etc., in the ETC (Electronic Toll Collection system) apparatus.

When wishing to mount a position detecting system using satellites and a DSRC system on car navigation apparatus, etc. at the same time, high costs and increased power consumption are major problems that prevent such an implementation.

In conventional car navigation apparatus, as shown in an example of FIG. 11, a GPS module 601 is mounted as position detecting means and a DSRC module 602 for ETC is mounted as a DSRC system, both interconnected with a navigation apparatus main unit 603 for displaying information to the driver. The GPS module is composed of an antenna section 604 for receiving GPS signals, an RF section 605, and a GPS baseband processor 606. The GPS baseband processor 606 uses a GPS signal preprocessor 608 for performing high-speed demodulation on RF input signals 607 that have been converted to the baseband bandwidth and uses a CPU 609, a ROM 610, a RAM 611, an RTC (real-time clock) 612, and a non-volatile RAM 613 dedicated for GPS for controlling the GPS signal preprocessor and process and save demodulated signals.

Meanwhile, the DSRC module 602 is composed of an antenna section 614 for receiving DSRC signals, an RF section 615, and a DSRC baseband processor 616. The DSRC baseband processor uses a DSRC signal preprocessor 618 for performing high-speed demodulation on RF input signals 617 that have been converted to the baseband bandwidth and uses a CPU 619, a ROM 620, a RAM 621, a cipher processing circuit 622, and a memory card 623 dedicated for DSRC for controlling the GPS signal preprocessor and process and save demodulated signals.

Power supply used is adapted, as shown in FIG. 12, to directly feed power to the GPS module 701 and the DSRC module 702.

DSRC map data supply mechanism, as shown in FIG. 13, is composed of a geographical information DB (database) 803 that provides ROM geographical information 802 recorded on CD-ROMs, etc., depending on the search input 801, position detecting apparatus 805 for outputting the current coordinate information 804, a display data generation circuit 807 for inputting coordinate information and searching the geographical information DB to acquire RAM geographical information and to generate and output geographical display data 806 corresponding to the geographical display range on the monitor, and a monitor 808 for receiving and displaying the geographical display data.

Geographical data display operation using position detecting apparatus and with DSRC apparatus is executed according to the flowchart in FIG. 14.

First, after display operation has started, in step S901, coordinate information is acquired from the GPS. Instep S902, display range is determined according to the coordinate information. In step S903, collation with the geographical information DB is made to determine whether a tollgate is present or not in the display range, and if any, in step S904, the tollgate coordinates and the toll are overlapped on the geographical image to generate display data. Otherwise, in step S905, the geographical image alone is displayed on the monitor as display data.

Next, activation of the DSRC section will be explained with reference to the flowchart in FIG. 15.

Once the DSRC section is activated via starting the engine of a vehicle, the DSRC section is under permanent power feed. In step S1002, the carrier sense, or output to detect whether radio waves in a bandwidth to be received are present or not, is checked. In case no carriers are detected, execution is exited and DSRC baseband processing is terminated. Otherwise, DSRC signal processing is executed in step S1004.

However, providing separate communication circuits in the position detecting means and the DSRC means has a drawback that product costs and power consumption are too high.

SUMMARY OF THE INVENTION

The invention is proposed in view of the foregoing situation and aims at reducing power consumption and providing low-cost and compact position detecting apparatus with DSRC feature and its control method.

Position detecting apparatus with DSRC feature according to the first aspect of the invention comprises position detecting means for receiving radio waves for position detection and outputting position information and DSRC means for receiving radio waves for DSRC and processing signals, characterized in that the position detecting means and the DSRC means are controlled via the same CPU and share part or whole of storage means and that the position detecting means is adapted to operate in either the full drive mode or suppress mode.

Via such a configuration, the position detecting means is adapted to operate at least in the full drive mode and suppress mode so that both modes can be used without increasing the throughput of CPU, by normally driving the position detecting means in the full drive mode and using the suppress mode only when the DSRC means is used.

Position detecting apparatus with DSRC feature of the first aspect of the invention according to the second aspect of the invention is characterized in comprising timing signal generating means for determining the approach to a DSRC base station and driving the DSRC means as well as placing the position detecting means in the suppress mode.

Via such a configuration, in addition to the advantage of the first aspect of the invention, the approach to a DSRC base station position is determined, timing signals are generated, and the timing signals are used to place the position detecting means in the suppress mode. This allows position detection and DSRC to be performed more efficiently.

Position detecting apparatus with DSRC feature of the first or second aspect of the invention according to the third aspect of the invention is characterized in further comprising a geographical database and position-related information adding means that adds and saves anew onto the storage means information obtained via DSRC means and new DSRC base station position information.

Via such a configuration, in addition to the foregoing advantages, received information that is not found in the database can be easily added. Position-related information can be automatically added within apparatus. This eliminates the need for updating the database thus saving database update costs. The storage means may be separately provided to store DSRC base station position information or the information may be stored in storage means for GPS.

Position detecting apparatus with DSRC feature of the second aspect of the invention according to the fourth aspect of the invention is characterized in that the position detecting means is adapted to enter the suppress mode on the arrival of timing signals from the timing signal generating means and to enter the full drive mode in synchronization with drive halt signals from the DSRC means.

Via such a configuration, in addition to the foregoing advantages, efficient use of power is allowed thus attaining cost reduction.

Position detecting apparatus with DSRC feature of the fourth aspect of the invention according to the fifth aspect of the invention is characterized in that the position detecting means is adapted to store position information before arrival of the timing signals in the storage means in the suppress mode and to read the position information from the storage means in synchronization with the drive halt signals from the DSRC means as well as to correct position information from the position information and correction information that is based on its history in order to use the resulting corrected information as return position information and to enter the full drive mode.

Via such a configuration, during DSRC, position information is corrected from the correction information and the correction information that is based on its history and the resulting corrected information is output as return position information, rather than suppressing driving of the position detecting means. Thus, position information can be displayed during communications with a DSRC base station without excessively intervening with position detecting operation. For example, using the output information as an initial value for the approximation in the GPS positioning calculation reduces the amount of operation. For the PHS, the output information may be used without approximation.

Position detecting apparatus with DSRC feature of the first aspect of the invention according to the sixth aspect of the invention is characterized in that, in the suppress mode, the DSRC means is driven with top priority and that operation of the position detecting means is suppressed in order not to give effects to the DSRC means.

Via such a configuration, suppressing the position detecting feature to prevent out of tracking makes it unnecessary to follow a step for returning from out of tracking in returning operation, thus suppressing the delay time in restarting positioning.

Position detecting apparatus with DSRC feature of the first aspect of the invention according to the seventh aspect of the invention is characterized in that, in the suppress mode, the position detecting means is turned off.

Via such a configuration, a lower-throughput CPU can be used and power reduction is possible that accompanies halting of operation of position detecting means.

Position detecting apparatus with DSRC feature of the first aspect of the invention according to the eighth aspect of the invention is characterized in that the position detecting means is adapted to be mounted on a vehicle, to detect and display the running position of the vehicle and that the DSRC means is an ETC (Electronic Toll Collection) system.

Via such a configuration, toll payment apparatus on a freeway or in a parking lot can be implemented with the minimum costs and power consumption.

A control method for position detecting apparatus with DSRC feature according to the ninth aspect of the invention comprises a position detecting step for outputting position information by receiving radio waves for position detection and a DSRC step for communicating with a DSRC base station, characterized in that the position detecting step is adapted to enter the suppress mode during the DSRC step.

Via such a configuration, the position detecting means normally performs position detection in the full drive mode and performs position detection in the suppress mode only when the DSRC means is used so that both modes can be used without increasing the throughput of CPU. This attains considerable reduction of power consumption.

While detecting "position information" via position detecting means refers to detecting the position where radio waves were received, it is assumed that it also refers to detecting general. "positioning information" such as time and correction information related to calculation as well as position information. Positioning information comprises position information including history of position obtained from time difference of signals coming from satellites and is so-called position-related information including a plurality of pieces of information that causes position, time, and calculation to converge in an early stage.

BRIEF DESCRIPTION OF THE DRAWINGS

FIGS. 1A and 1B show the principle of position detecting apparatus with DSRC feature according to the first embodiment of the invention.

FIGS. 2A and 2B show the principle of position detecting apparatus with DSRC feature according to the first embodiment of the invention.

DESCRIPTION OF THE PREFERRED EMBODIMENTS

Next, embodiments of the invention will be described. The first embodiment of the invention applies the invention to the ETC system on freeways. In this embodiment, DSRC can be performed when the position detecting control apparatus on board a vehicle has entered a DSRC area as the vehicle travels. The apparatus, with its principle shown in FIGS. 1A and 1B and FIGS. 2A and 2B, and its circuit diagram shown in FIG. 3, comprises a signal preprocessor means for radio waves for position detection and a signal preprocessor means for radio waves for DSRC, characterized in sharing a CPU that controls the two signal preprocessors means and the entire area of RAM and program ROM.

FIGS. 1A through 2B show CPU occupancy for GPS and DSRC assumed when the user 1 is inside or outside the DSRC area 3. FIG. 1A shows CPU occupancy for GPS and DSRC assumed when the user is outside the DSRC area. In the figure, only the GPS occupies the CPU. FIG. 1B shows the point of time when the user has approached a tollgate 2 in the DSRC area and the DSRC section has been activated. FIG. 2A shows the state in which the user has entered the DSRC area and started communications. In this state, the GPS uses only a small portion of CPU throughput, with the DSRC mainly using the CPU. FIG. 2B shows the state in which the vehicle 1 has exited the tollgate in the DSRC area and has :returned to GPS communications. In this state, only the GPS occupies the CPU.

Figure 3:
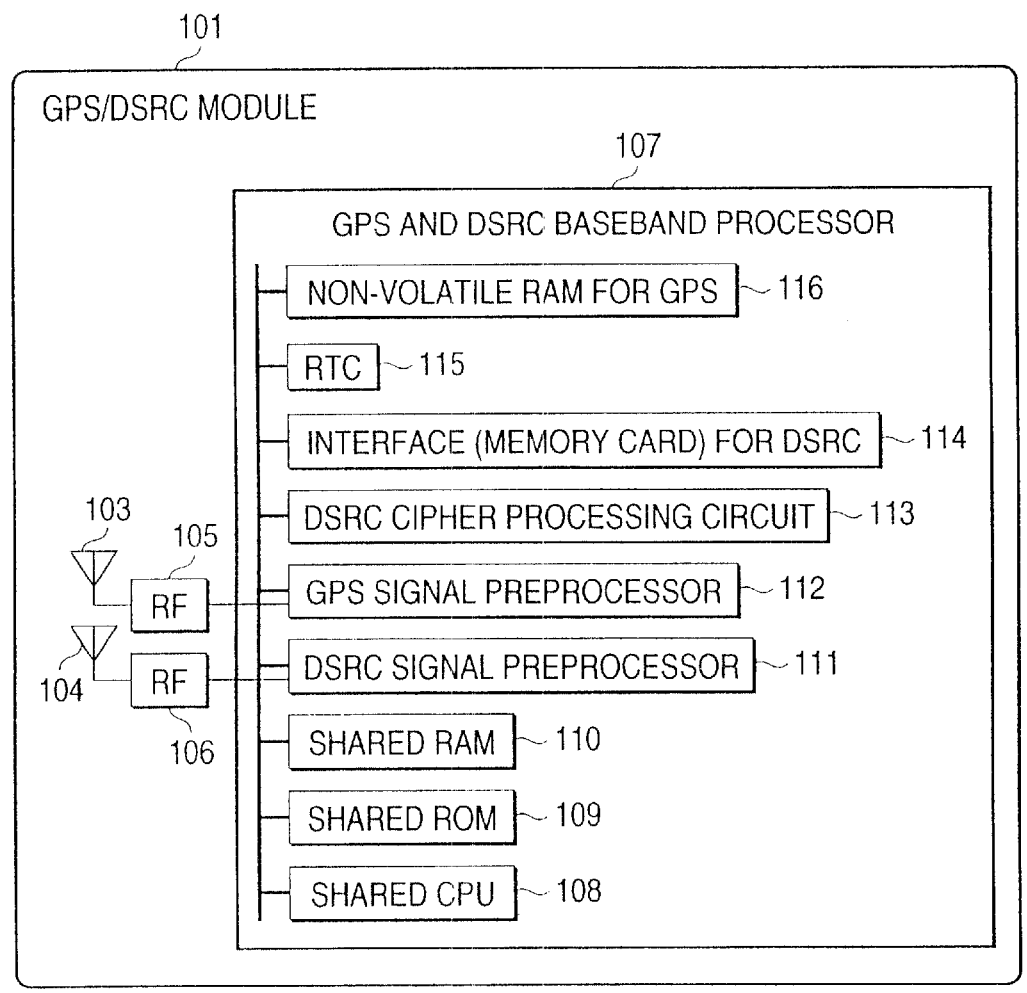
FIG. 3 is a circuit block diagram of position detecting apparatus with DSRC feature according to the first embodiment of the invention.

FIG. 3 is a block diagram showing the configuration of position detecting apparatus with DSRC feature according to an embodiment of the invention. The position detecting apparatus, as shown in FIG. 3, is composed of GPS/DSRC module 101, which is composed of an antenna for DSRC 104, an antenna for GPS 103, an RF section for GPS 105 for converting receive signals from each antenna to baseband signals, an RF section DSRC 106, a GPS and DSRC baseband processor 107 for performing baseband processing for GPS and DSRC. The GPS and DSRC baseband processor is composed of a shared CPU 108 that is used for both GPS processing and DSRC processing, a shared RAM 110, a shared ROM 109, a GPS signal preprocessor 112 for inputting GPS baseband signals and control signals from the processor and performing high-speed lower-layer demodulation, a DSRC signal preprocessor 111 for inputting GPS baseband signals and control signals from the processor and performing high-speed lower-layer demodulation, a DSRC cipher processing circuit 113, a memory card interface 114 for recording DSRC communication history such as available amount data and ID information, an RTC section 115 for managing the current time via GPS, and a non-volatile RAM 116 for recording position data. These components are interconnected via data buses. The CPU, ROM and RAM are shared by halting detailed control of the GPS signal preprocessor to control the DSRC signal preprocessor during DSRC signal processing.

Figure 4:
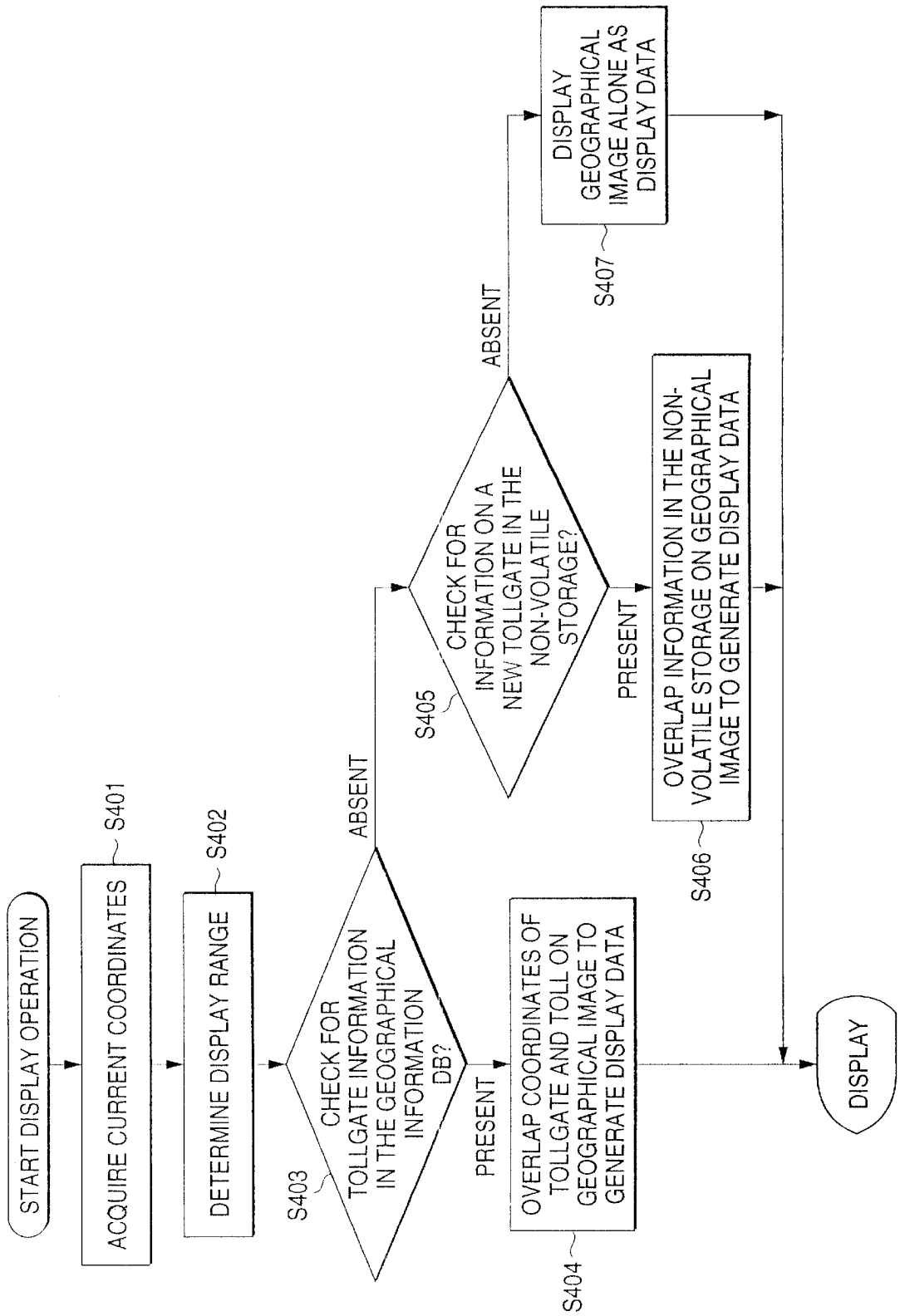
FIG. 4 is a flowchart showing the method for displaying geographical data for DSRC apparatus according to the first embodiment of the invention.

Next, geographical data display operation using position detecting apparatus with DSRC feature will be explained. FIG. 4 is a flowchart showing a method for displaying geographical data by position detecting apparatus with DSRC feature.

First, the power of the position detecting apparatus with DSRC feature is turned on to display geographical data. After starting display operation, in step S401, the current coordinates obtained from a non-volatile RAM for GPS 116 are acquired. In step S402, the display range is determined depending on the current coordinates. Then, in step S403, an RF section for GPS 105 checks whether a tollgate is present or not in the geographical information DB for the display range. In case a tollgate is found, in step S404, the tollgate coordinates and the toll are overlapped on the geographical image to generate display data. In case a tollgate is not found, in step S405, a checkup is made to determine whether information on a new tollgate is stored in the non-volatile RAM for GPS 116.

In case information of a new tollgate is found in the RAM, in step S406, information in the non-volatile RAM for GPS 116 is overlapped on the geographical image to generate display data. Otherwise, in step S407, the geographical image alone is displayed on the monitor as display data.

Via this procedure, new tollgates for ETC can be displayed on geographical image.

Figure 5:
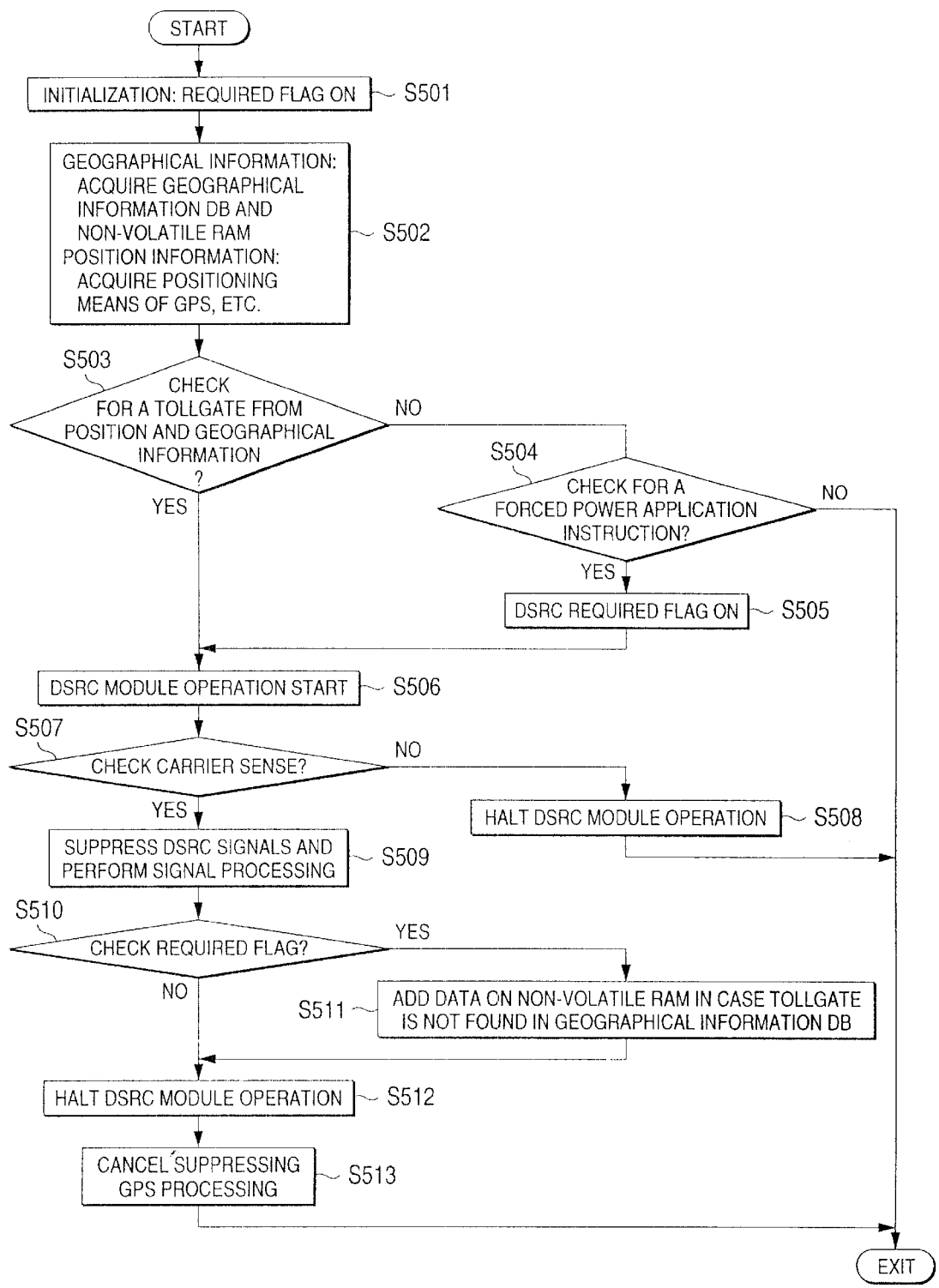
FIG. 5 is a flowchart of the operation according to the first embodiment of the invention.

Next, position detection operation and DSRC operation using the position detecting apparatus with DSRC feature will be explained with reference to the flowchart in FIG. 5.

For this apparatus, procedure starts with turning on the power supply. In step S501, a required flag is turned on to initialize the apparatus. Next, in step S502, geographical information is acquired from geographical information DB and position information from GPS. In step S503, the position and geographical information is used to check for a tollgate. In case a tollgate is found in the geographical information DB, in step S506, the required flag of DSRC is turned off and in step S503, the DSRC power is turned on. Otherwise, in step S504, a checkup is further made to determined to presence of a forced power application instruction. In case a forced power application is instructed, in step S505, the required flag of DSRC is turned on then DSRC power is turned on.

In case a forced power application is instructed, execution terminates. After the DSRC is turned on, in step S507, carrier sense is checked that is generated on receipt of signals at the RF section 106 of DSRC. If no carrier sense is detected, execution makes transition to the initial state. Otherwise, in step S509, GPS signals are suppressed and DSRC signals are processed. In step S510, the required flag of DSRC is checked. In case the flag is on, a new tollgate not on the geographical information DB is assumed and, in step S511, DSRC information such as position information and toll information is added in the non-volatile RAM. Otherwise, a tollgate in the geographical information DB is assumed and, in step S512, DSRC module operation is stopped and, in step S513, suppression of GPS processing is canceled.

In case no carrier sense is found in the decision step S507, DSRC module operation is stopped S508 and execution exits.

While the foregoing operation is executed on a regular basis, for example at intervals of one second, the operation may be executed in synchronization with the screen scroll or as a constant loop operation.

For an intermitted operation, initialization is made once the apparatus is activated.

In order to recover the processing just before power failure, power completion processing including data save is required. It is desirable to write data in the buffer area then set a flag to indicate the buffering state, finally transfer the buffer data in the write area, then cancel the flag. Another countermeasure is to input from a power supply the signals to report any power outage in advance. This procedure allows only new tollgates to be detected thus writing data efficiently to non-volatile RAM without data overlap. Further, information on tollgates can be displayed based on geographical information databases and non-volatile memory thus controlling DSRC power and reducing power consumption.

While GPS module operation is suppressed during DSRC module operation in the foregoing example, GPS module operation may be stopped.

The GPS module may be adapted, in the suppress mode, to store the position information before arrival of the timing signals in the storage means, and in synchronization with the drive halt signals for the DSRC means, to read position information from the storage means as well as to correct position information from the latest position information and its history then output the resulting information as return position information and enter the full drive mode.

Features to be stopped in the GPS module, complexity of CPU processing required while the GPS module is halted, and the processing and procedure for recovery is influenced by the features shared by hardware and software. It is desirable to optimize such factors depending on the power consumption, costs and required recovery time.

Desirably, procedures up to tracking control is performed constantly to remarkably reduce the time required for recovery operation.

Embodiment 2

Figure 6:
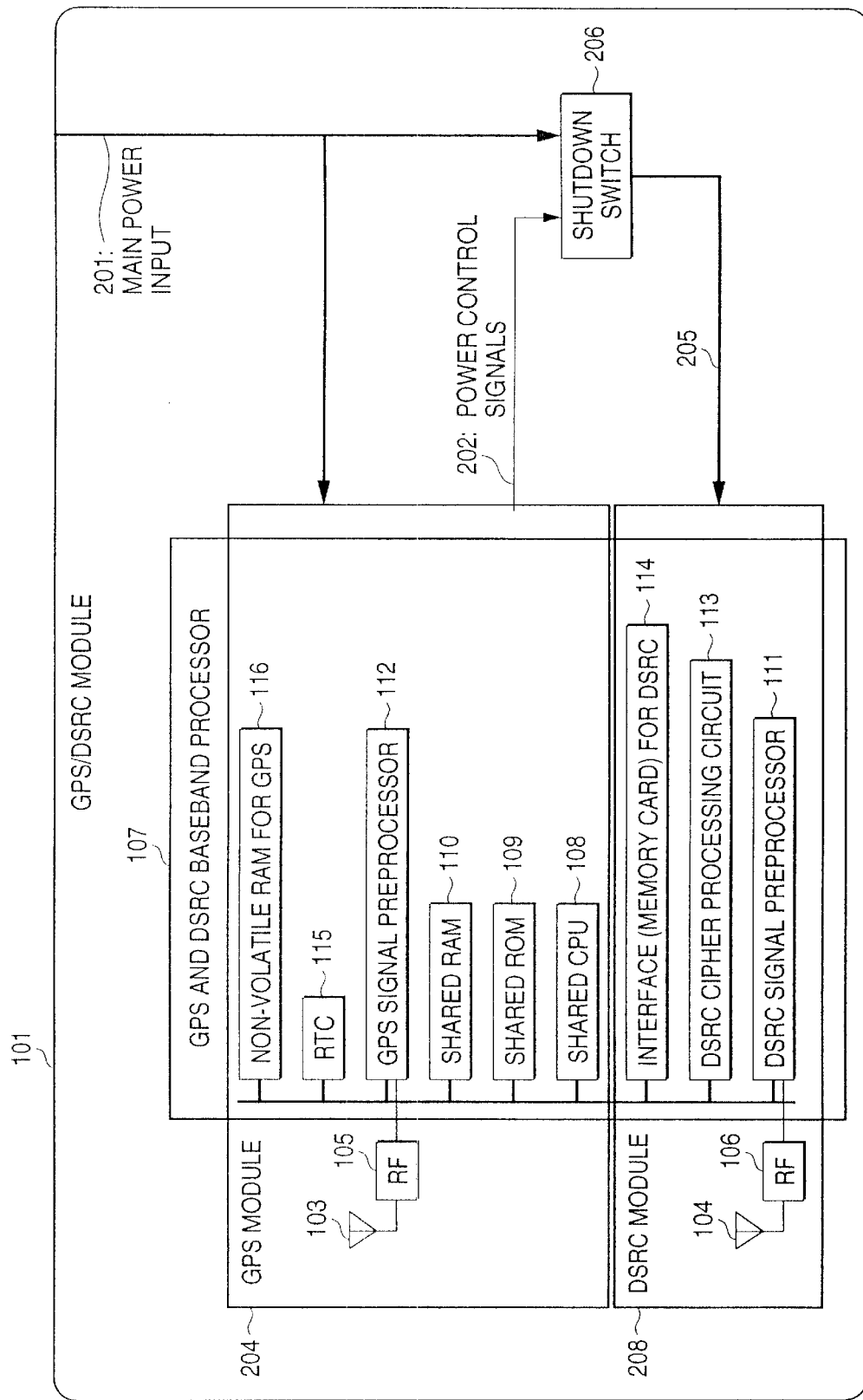
FIG. 6 is shows position detecting apparatus with DSRC feature according to the second embodiment of the invention.

Power unit for the position detecting apparatus will be explained. FIG. 6 is a block diagram showing position detecting apparatus according to the second embodiment of the invention, in particular the configuration of the power unit. Main sections of the module is the same as embodiment 1. The figure presents a detailed example of the power switch.

The power unit is, as shown in FIG. 6, built in the GPS module 204. The GPS signal processor 112, the shared CPU 108 and so on perform actual signal processing. Main power input 201 for constantly feeding power is used to perform signal processing via the GPS signal processor 112, the shared CPU 108 and so on depending on the results on position detection, to output power control signals 202. Application of the power control signals and main power input causes a shutdown switch 206 to output DSRC main power input signals 205. Input of DSC main power causes the GPS signal processor 112, the shared CPU 108 and so on in the DSRC module 208 to perform signal processing. Here, the approach to DSRC base station is sensed using the results of GPS position detection to suppress GPS module power. Power control signals 202 from the DSRC section is activated to start the DSRC module via the shutdown switch 206. Power control signals to the DSRC section are halted when the DSRC base station is far away to stop driving of the DSRC module and return the GPS module in the initial state.

The remaining sections are configured the same as the embodiment 1.

Figure 7:
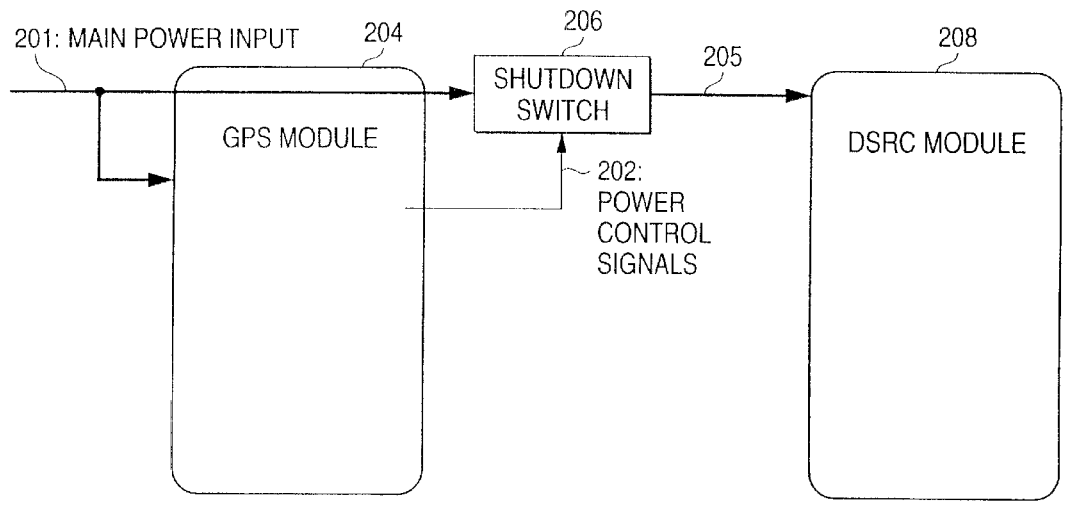
FIG. 7 shows a variation of the power supply unit for implementing the method according to the invention.
Figure 8:
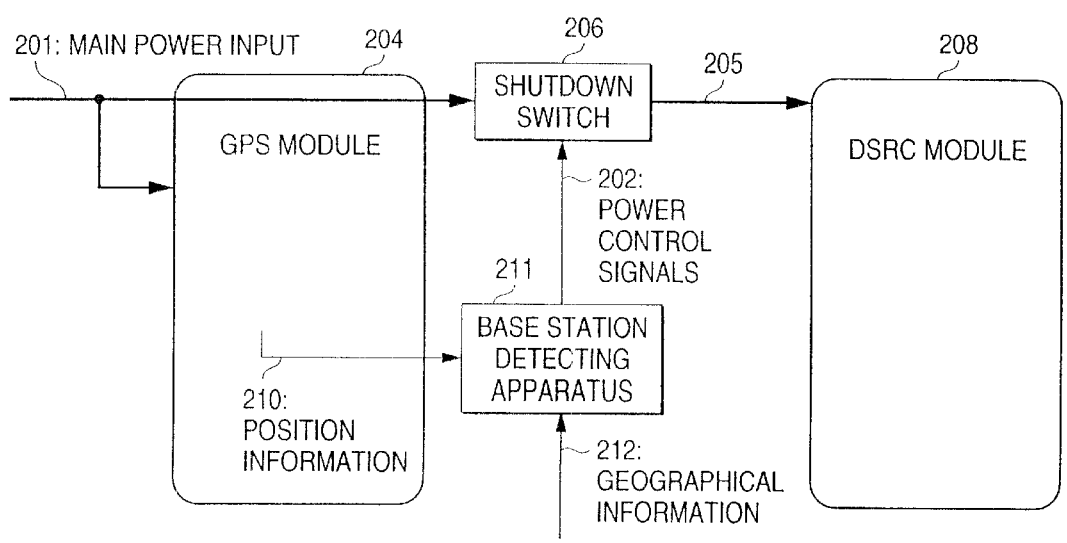
FIG. 8 shows a variation of the power supply unit with a base station detecting apparatus for implementing the method according to the invention.

While in the foregoing embodiment uses an example where a GPS module and a DSRC module are integrated sharing CPU and RAM, the GPS module and the DSRC module may be separately formed to share the main power, with only power control performed, as show n in FIGS. 7 and 8.

In this example, as shown in FIG. 7. CPU, ROM, and RAM are separately provided in the GPS module and the DSRC module. In driving the DSRC module, operation of the GPS module is halted or suppressed via reduced power in order to limit the power consumption of the entire apparatus to the power required for normal GPS operation.

Configuration in FIG. 8, a variation of that in FIG. 7, is characterized in that a base station detecting apparatus 211 is added which outputs position detecting information (position information) 210, without outputting power control signals directly from the GPS module 204, to determine the approach to a DSRC base station and to output power control signals 202.

Via this configuration, activation and shutdown of DSRC apparatus on detecting the approach to a DSRC base station is made possible without the GPS module having to mount a complicated mechanism such as route calculation besides communications and position detection.

Figure 9:
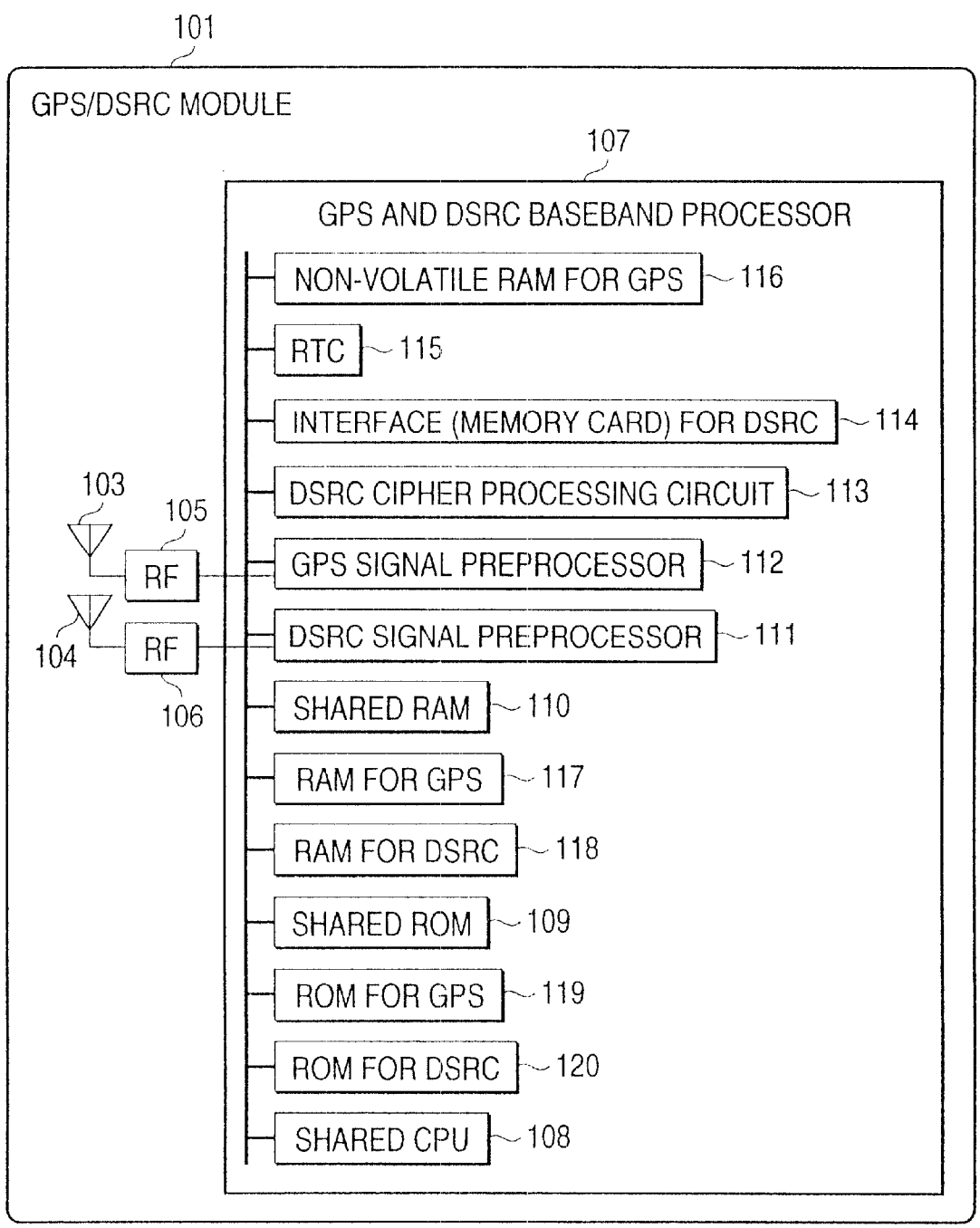
FIG. 9 shows a variation of the circuit block diagram according to the first embodiment of the invention.

While the embodiment 1 shows an example where the entire RAM and ROM are shared, separate sections may be provided as well as shared sections. FIG. 9, a variation of the example of FIG. 1, shows a configuration comprising a RAM dedicated for GPS 117, a RAM dedicated for DSRC 118, a ROM dedicated for GPS 119, and a ROM dedicated for DSRC 120 as well as a shared RAM and a shared ROM.

Via this configuration, memory data that is most frequently used is mounted in a compact memory circuit, with a short data line used for connection. This reduces power consumption.

Embodiment 3

The third embodiment of the invention is a configuration where position detecting apparatus is equipped with geographical data supply unit.

Figure 10:
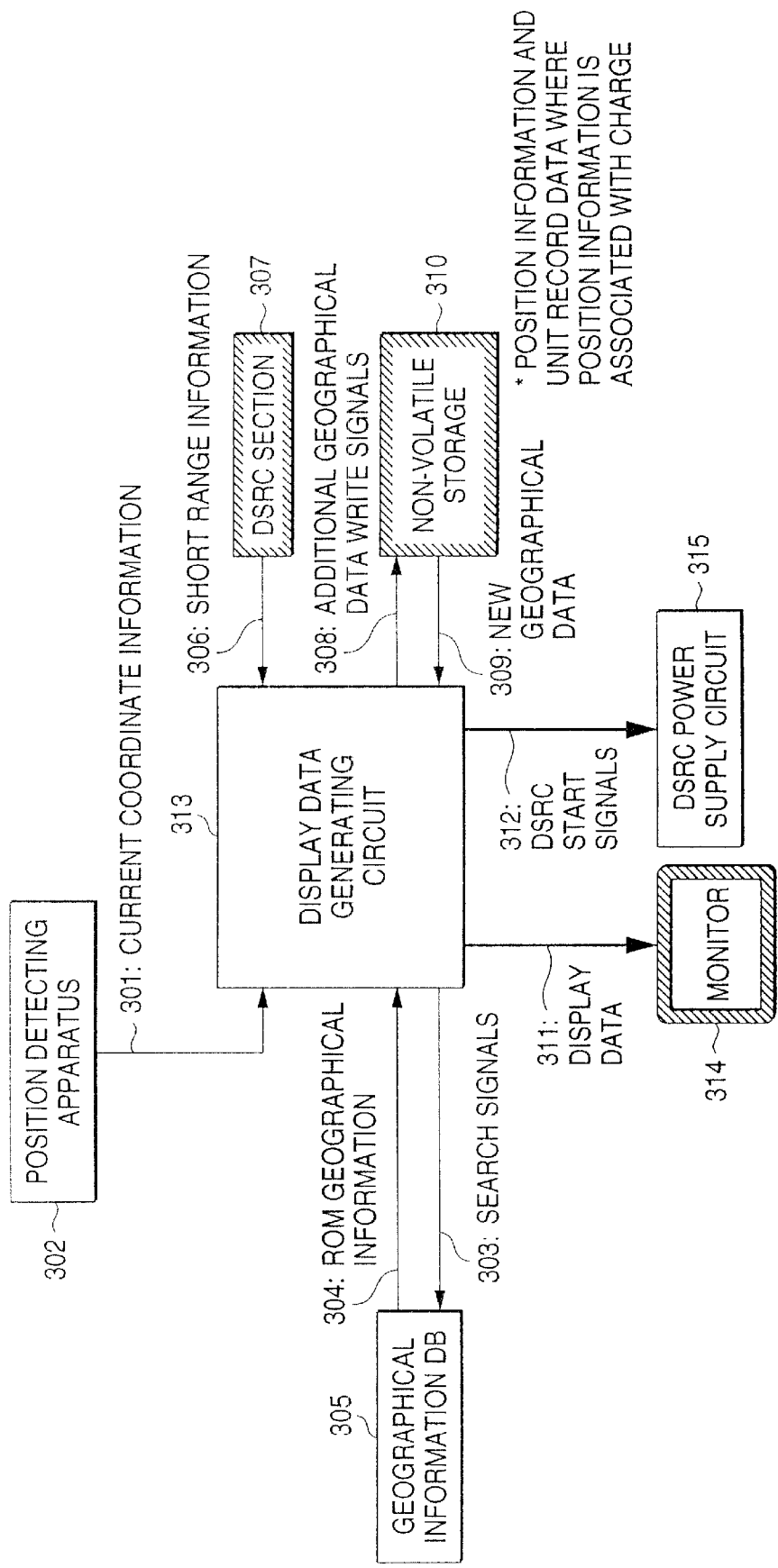
FIG. 10 is a circuit block diagram of position detecting apparatus with DSRC feature according to the third embodiment of the invention.
Figure 11:
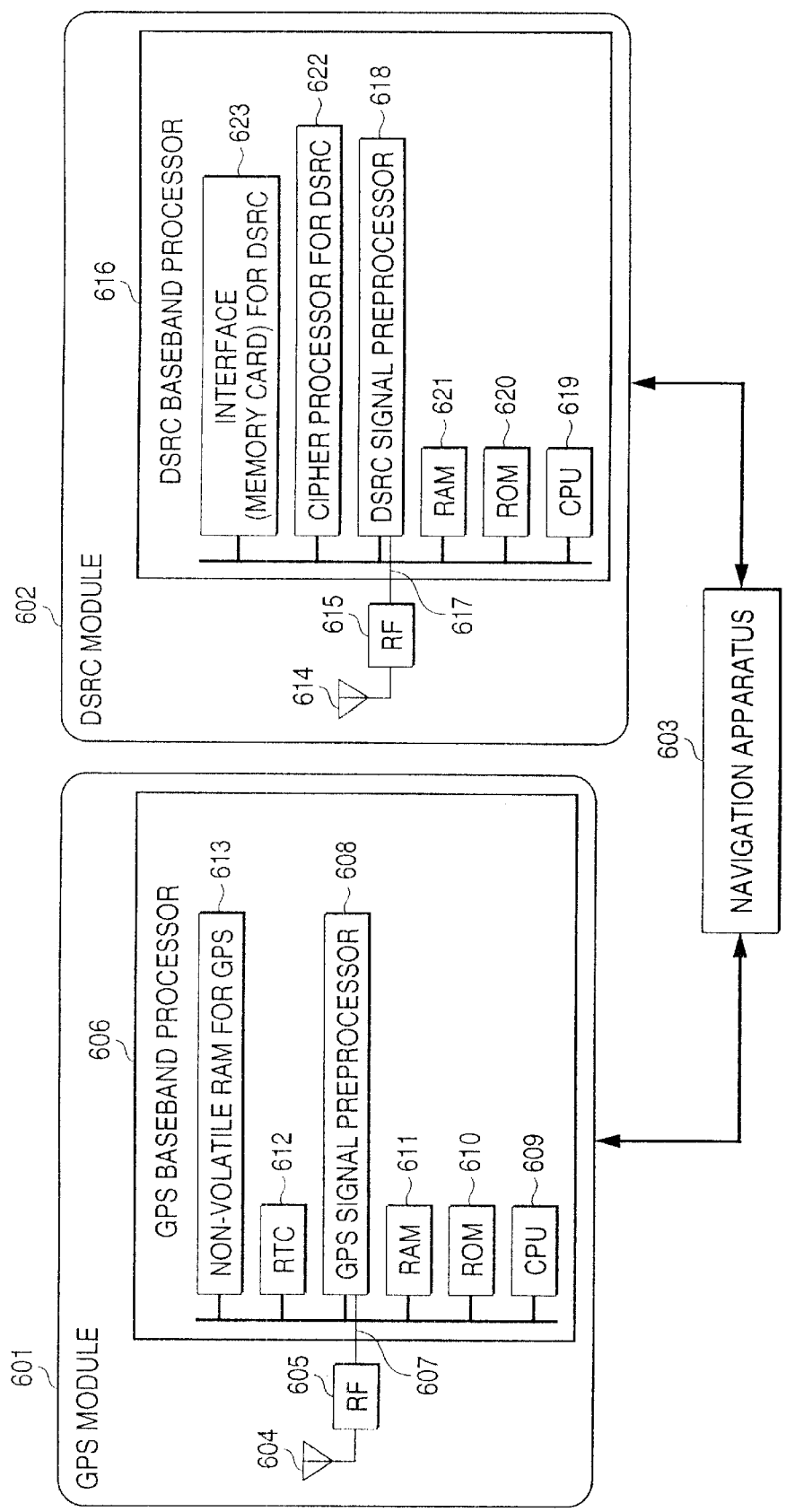
FIG. 11 shows position detecting apparatus according to the conventional art.
Figure 12:
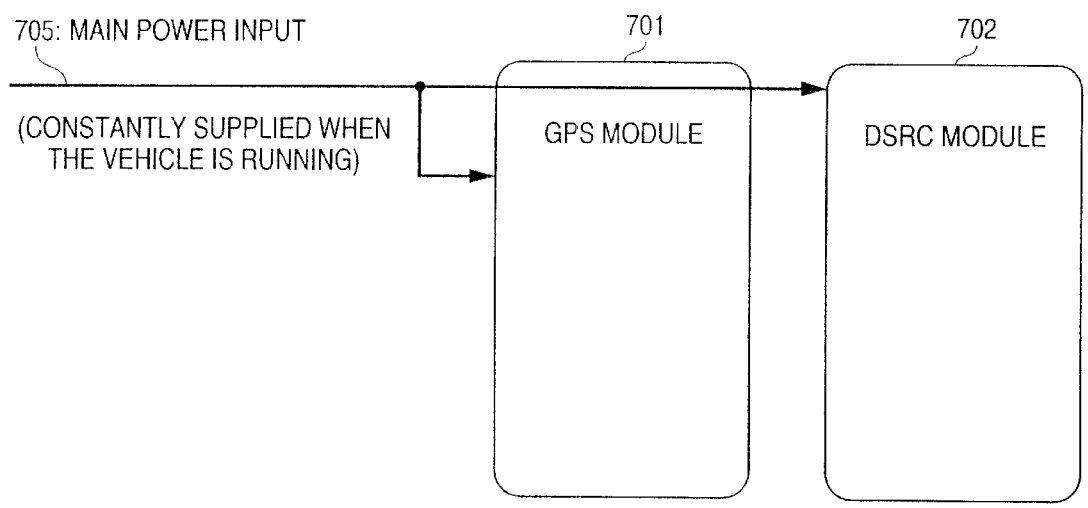
FIG. 12 shows a power supply unit for position detecting apparatus according to the conventional art.
Figure 13:
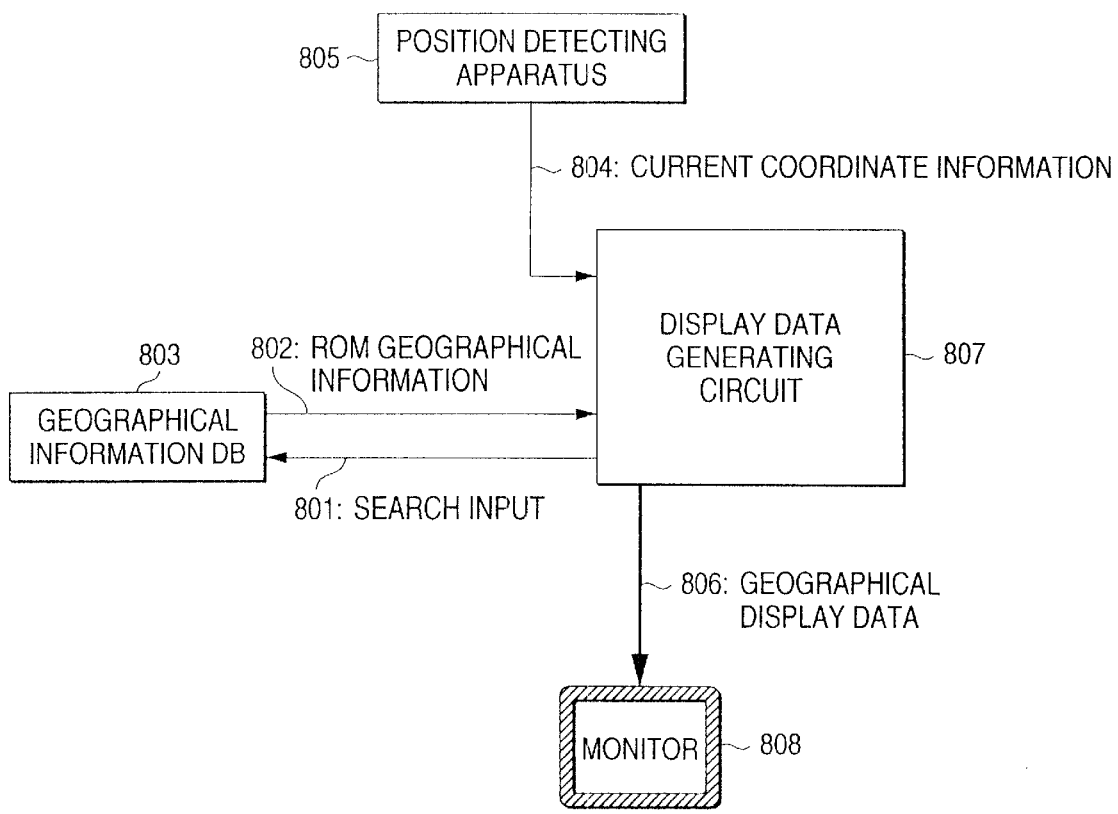
FIG. 13 shows a geographical data supply unit for position detecting apparatus according to the conventional art.
Figure 14:
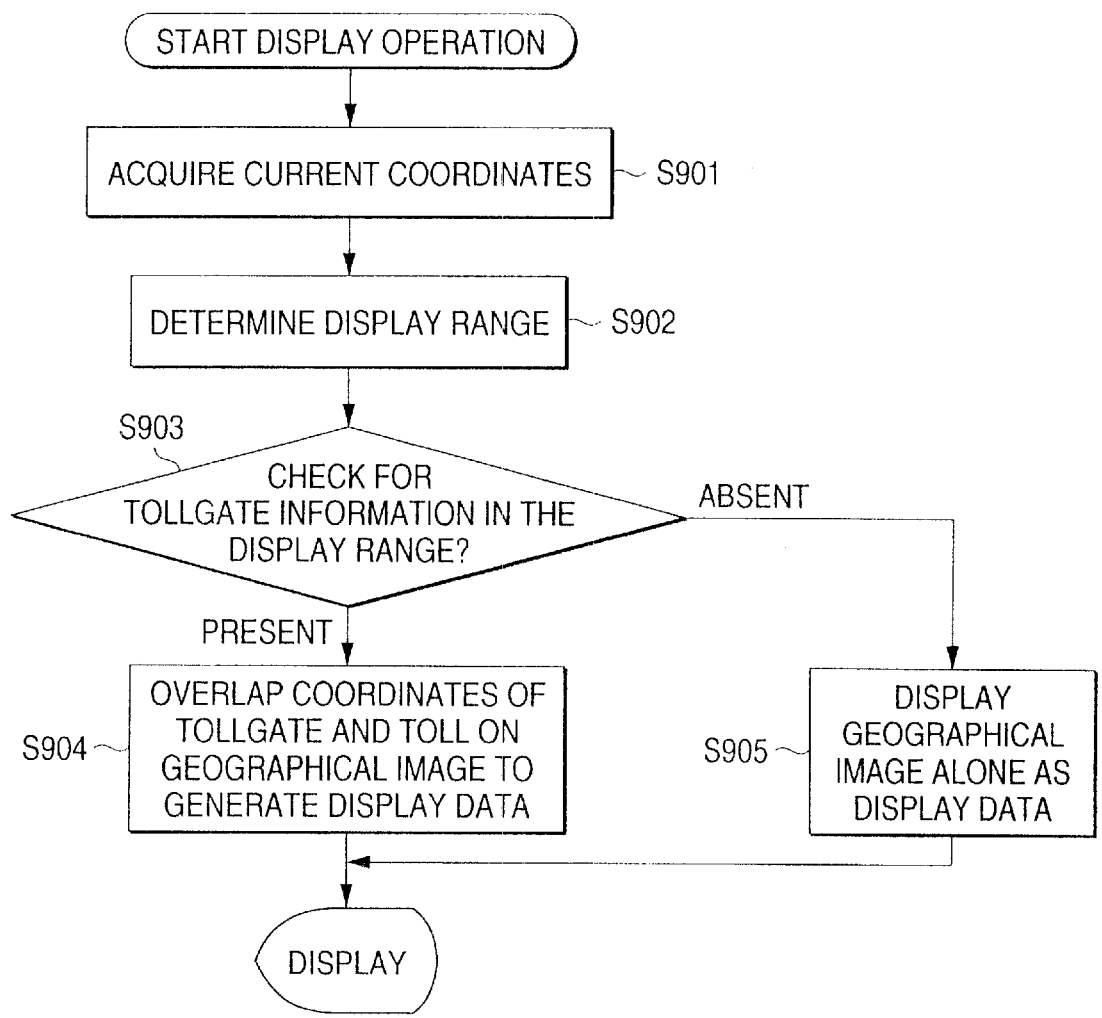
FIG. 14 shows a geographical data display method for position detecting apparatus according to the conventional art.
Figure 15:
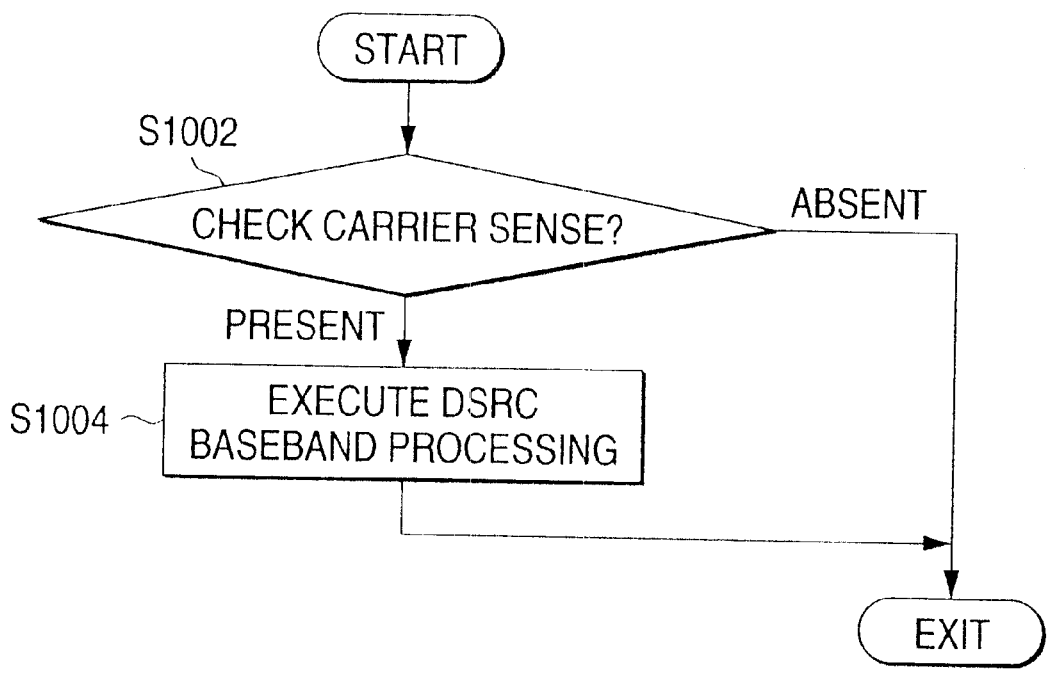
FIG. 15 shows a power supply method for position detecting apparatus according to the conventional art.

FIG. 10. shows the block diagram of such apparatus. The apparatus is composed of position detecting apparatus (positioning apparatus: GPS module) 302 for outputting the current coordinate information 301, a geographical information database (DB) 305 for inputting search signals 303 and outputting ROM geographical information 304 such as the coordinates of a DSRC base station and toll information, a DSRC section 307 for performing DSRC communications for ETC and outputting short range information 306 such as billing information, a storage 310 for inputting additional geographical data write signals 308 in order to register the coordinates of a new DSRC base station and DSRC information not found in the geographical information DB, thus allowing the location of a DSRC base station to be registered and read out as new geographical data 309, a display data generating circuit 313 for inputting the coordinate information, outputting search signals for geographical DB, inputting ROM geographical information and DSRC information in the DSRC section, outputting additional geographical data write signals, inputting new geographical data, integrating the coordinate information and new geographical data, and outputting display data 311 and DSRC start signals 312, a monitor 314 for presenting display data, a DSRC power supply circuit 315 for inputting DSRC start signals and activating/shutting down the DSRC power supply.

Via this configuration, it is possible to temporarily limit or halt operation of CPU used for position detection to let the DSRC communication feature to virtually occupy the CPU while maintaining the position detecting circuit data in order to share the CPU. The ROM section can share the ROM programs and data used for control such as activation, initialization, communications and shipping inspection as well as calculation. This reduces the ROM size. The RAM section can share common-purpose data such as initial setting and position detecting information. This reduces the RAM size. By sharing circuits that need not operate simultaneously, circuits can be shrunk thus reducing costs and power consumption.

According to the invention, by comprising position detecting means for outputting position information and timing means for determining the approach to a DSRC base station and activating/shutting down the DSRC means, it is possible to detect a position where the DSRC section is to operate via position information obtained using the position detecting means and, as required, to make control such as activating/shutting down the DSRC section. This reduces the power for the DSRC means that need not operate constantly.

According to the invention, by comprising a geographical database, storage means, position-related information adding means that saves anew onto the storage means information and position information obtained via DSRC means, display means for displaying data with the approach to a DSRC base station, or timing generating means for activating/shutting down the power supply for the DSRC means, the position-related information of the DSRC base station can be added in the storage means as well as the geographical information database. Thus it is possible to display on a geographical image a new DSRC base station installed after the latest update of the geographical data. By comprising non-volatile storage means, it is possible to reduce power via power activation and shutdown control of the DSRC means.

According to the invention, by comprising a step for searching a geographical database, a step for determining the relative approach to a DSRC base station to activate the power for the DSRC means, a step for forcibly activating the DSRC power supply via means other than position information, a step for checking for the DSRC base station thus detected after the forcible DSRC activation, a step for writing position information and information obtained via DSRC onto the storage means once the DSRC base station has been confirmed, a step for performing DSRC communications, and a step for shutting down the DSRC power supply once the DSRC communications are complete, it is possible to obtain the timing for activating the DSRC means power supply by using the position information and a geographical database for the DSRC base station this reducing power consumption. It is also possible to record the position information of a DSRC base station not found in the geographical database onto storage means. This allows such information to be retrieved from the storage means on the next approach to a DSRC base station so that the DSRC means can be automatically activated as well as a geographical information database.

While the foregoing embodiment explains the ETC apparatus, the DSRC as short range communications have such applications as control of information on nearby stores and parking lots including the charge collecting apparatus in a parking lot, the charge settling system in a gas station, the cargo tag physical distribution control system in a physical distribution system.

The invention is applicable to, for example, a sightseeing information service provided via a mobile terminal equipped with DSRC feature. Sightseeing spots conventionally provides a service whereby tourists can rent mobile terminals with built-in GPS and DSRC. Such a service is provided by local sightseeing associations or travel agents that installs DSRC base stations in which sightseeing information is stored. It is possible to apply the invention to this service and provide tourists with a service whereby the tourists can display sightseeing information on mobile terminals that is stored in DSRC base stations deployed in places. Mobile terminals carried by tourists automatically acquire the latest contents via DSRC communication when approaching to such DSRC base stations. Tourists can refer to sightseeing information, public announcement and peripheral geographical information to determine the next spot to visit. The DSRC lets tourists obtain the latest and highest volume information without paying communication charge thus checking the latest information such as congestion or opening time of events that helps them make the best choice. Traders in a sightseeing spot can make a research on how long, what type of people were in what places with low operation costs.

As mentioned earlier, according to the invention, it is possible to provide position detecting apparatus that allows reduction of costs and power consumption while maintaining a high reliability.

What is claimed is:

1. Position detecting apparatus with DSRC feature comprising:
    position detecting means for receiving radio waves for position detection and outputting position information;
    and dedicated short range communication (DSRC) means for receiving radio waves for DSRC and processing signals,
        wherein the position detecting means and the DSRC means are controlled via the same CPU and share part or whole of storage means and that said position detecting means is adapted to operate in either a full drive mode or a suppress mode.

2. Position detecting apparatus with DSRC feature according to claim 1, wherein position detecting means comprises timing signal generating means for determining the approach to a DSRC base station and driving said DSRC means as well as placing said position detecting means in the suppress mode.

3. Position detecting apparatus with DSRC feature according to claim 1, further comprising
    a geographical database; and
    position-related information adding means that adds and saves anew onto said storage means information obtained via DSRC means and new DSRC base station position information.

4. Position detecting apparatus with DSRC feature according to claim 2, wherein said position detecting means is adapted to enter the suppress mode on the arrival of timing signals from said timing signal generating means and to enter the full drive mode in synchronization with drive halt signals from said DSRC means.

5. Position detecting apparatus with DSRC feature according to claim 2, wherein said position detecting means is adapted to store position information before arrival of said timing signals in the storage means in said suppress mode and to read said position information from said storage means in synchronization with the drive halt signals from said DSRC means as well as to correct position information from said position information and correction information that is based on its history in order to use the resulting corrected information as return position information and to enter the full drive mode.

6. Position detecting apparatus with DSRC feature according to claim 1, wherein in said suppress mode, said DSRC means is driven with top priority and that operation of said position detecting means is suppressed in order not to give effects to said DSRC means.

7. Position detecting apparatus with DSRC feature according to claim 1, wherein, in said suppress mode, said position detecting means is turned off.

8. Position detecting apparatus with DSRC feature according to claim 1, wherein said position detecting means is adapted to be mounted on a vehicle, to detect and display the running position of the vehicle and that said DSRC means is an ETC (Electronic Toll Collection) system.

9. The position detecting apparatus as claimed in claim 1, wherein said position detecting means is adapted to operate in the suppress mode during communication by said DSRC means.

10. A control method for position detecting apparatus with dedicated short range communications (DSRC) feature comprising:

a position detecting step for outputting position information by receiving radio waves for position detection; and a DSRC step for communicating with a DSRC base station, wherein said position detecting step is adapted to enter a suppress mode during said DSRC step.

11. A control method for position detecting apparatus with DSRC feature according to claim 10, wherein said position detecting step comprises a step for determining the approach to a DSRC base station and conducting said DSRC step according to a determined result.

12. A control method for position detecting apparatus with DSRC feature according to claim 10, wherein said apparatus comprises a geographical database; and said control step comprises a step of adding and saving information obtained via DSRC means and new DSRC base station position information.

13. A control method for position detecting apparatus with DSRC feature according to claim 10, wherein said position detecting steps is adapted to enter the suppress mode on the arrival of timing signals and to enter the full drive mode in synchronization with drive halt signals from said DSRC means.

14. A control method for position detecting apparatus with DSRC feature according to claim 13, further comprising the steps of:

storing position information before arrival of said timing signals in the storage means in said suppress mode and reading said position information from said storage means in synchronization with the drive halt signals from said DSRC means as well as to correct position information from said position information and correction information that is based on its history in order to use the resulting corrected information as return position information and to enter the full drive mode.

15. A control method for position detecting apparatus with DSRC feature according to claim 10, wherein in said suppress mode, said DSRC means is driven with top priority and that operation of said position detecting means is suppressed in order not to give effects to said DSRC means.

16. A control method for position detecting apparatus with DSRC feature according to claim 10, wherein in said suppress mode, said position detecting step is turned off.

17. A control method for position detecting apparatus with DSRC feature according to claim 10, wherein said position detecting step is adapted to detect and display the running position of the vehicle and that said DSRC means is an ETC (Electronic Toll Collection) system.

* * * * *

UNITED STATES PATENT AND TRADEMARK OFFICE
CERTIFICATE OF CORRECTION

PATENT NO.     : 6,516,285 B1                                        Page 1 of 1
DATED          : February 4, 2003
INVENTOR(S)    : Hori et al.

It is certified that error appears in the above-identified patent and that said Letters Patent is hereby corrected as shown below:

Title page,
Item [73], Assignee, please delete "Co.", and insert therefor -- Co., --.

Column 2,
Line 17, please delete "Instep", and insert therefor -- In step --.

Column 4,
Line 37, please delete "general.", and insert therefor -- general --.

Column 5,
Line 29, please delete "on board", and insert therefor -- onboard --.
Line 50, please delete ":returned", and insert therefor -- returned --.

Column 8,
Line 16, please delete "show", and insert therefor -- shown --.

Column 10,
Lines 51-52, please delete "either a full drive mode or a suppress mode", and insert therefor -- both a full drive mode, wherein in said full drive mode, operation of the position detecting means is not suppressed, and a suppress mode, wherein in said suppress mode, operation of the position detecting means is suppressed --.

Column 11,
Line 41, please delete "a suppress mode during", and insert therefor -- a suppress mode, wherein in said suppress mode, operation of the position detecting means is suppressed, during --.

Signed and Sealed this

Sixteenth Day of December, 2003

JAMES E. ROGAN
*Director of the United States Patent and Trademark Office*